Figure 1:
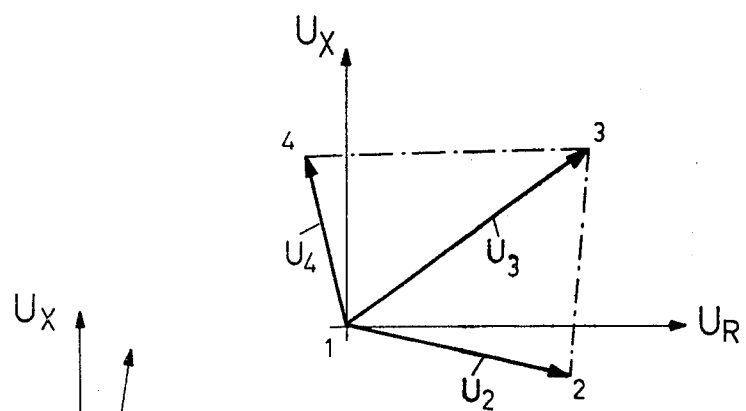

United States Patent [19]

De Mesmaeker

[11] 4,237,511
[45] Dec. 2, 1980

[54] SELECTIVE PROTECTION PROCESS FOR ELECTRICAL LINES AND DEVICE FOR CARRYING OUT THE PROCESS

[75] Inventor: Ivan De Mesmaeker, Fislisbach, Switzerland

[73] Assignee: BBC Brown, Boveri & Co Ltd, Baden, Switzerland

[21] Appl. No.: 953,788

[22] Filed: Oct. 23, 1978

[30] Foreign Application Priority Data

Oct. 31, 1977 [CH] Switzerland .................. 13196/77

[51] Int. Cl.³ .................... H02H 7/26; H02H 7/26
[52] U.S. Cl. .................................. 361/80; 361/82; 361/84; 361/85; 324/51; 361/82; 361/84; 361/85; 324/51
[58] Field of Search ............ 361/79, 80, 81, 82, 361/85; 324/51; 361/79, 80, 81, 82, 85; 324/51

[56] References Cited

U.S. PATENT DOCUMENTS

| | | | |
|---|---|---|---|
| 3,475,655 | 10/1969 | Suzuki | 361/80 |
| 3,731,152 | 5/1973 | Rockefeller, Jr. | 361/80 |
| 4,092,691 | 5/1978 | Williams | 361/80 |

FOREIGN PATENT DOCUMENTS

2064679  5/1973  Fed. Rep. of Germany ............ 361/80

Primary Examiner—Harry E. Moose, Jr.
Assistant Examiner—L. C. Schroeder
Attorney, Agent, or Firm—Werner W. Kleeman

[57] ABSTRACT

A distance-selective short-circuit monitoring device with a low response time (FIG. 3, FIG. 5) results from sequence detection of first and second monitoring signals ($US_1$, $US_2$) which are selectively allotted to the zero cross-overs of detection signals ($Ud_1$–$Ud_4$) which determine a polygonal triggering zone, the selective allocation being in accordance with the sign of the signal change rate, and by counting the alternations between first and second monitoring signals ($US_1$, $US_2$) within a predetermined monitoring interval ($Tu$), the duration of which corresponds at least approximately to a half-period of the mains frequency.

8 Claims, 9 Drawing Figures

SELECTIVE PROTECTION PROCESS FOR ELECTRICAL LINES AND DEVICE FOR CARRYING OUT THE PROCESS

U.S. patent application Ser. No. 890,794 filed Mar. 27, 1978, and U.S. patent application Ser. No. 953,637, filed Oct. 23, 1978, relate to similar subject matter by the same applicant herein.

The invention relates to a selective protection process for electrical lines, in which detection signals dependent on the distance between the point of measurement and the point of short-circuit are formed, for one line phase at a time, from the line current and the line voltage, and in which the relative phase angles between detection signals following one another in time are compared in order to produce a triggering signal with a critical value of at least approximately 180°, in particular according to U.S. patent application Ser. No. 890,794, filed Mar. 27, 1978, with at least one difference signal between a reference impedance voltage and a line voltage as the detection signal. The invention further relates to a device for carrying out such a process.

The abovementioned patent discloses a process and a device by means of which a distance-dependent triggering, in the event of a short-circuit, is achieved on the basis of difference signals between impedance reference voltages and a line voltage, by simple phase angle monitoring. The means specifically mentioned are suitable for causing triggering within at most the duration of one period of the difference signals which have the mains frequency, that is to say at most 20 ms after excitation or after occurrence of the fault. In general, however, a shortening of the response time of the short-circuit monitoring system, that is to say of the abovementioned maximum time interval, is desirable. Accordingly, it is the object of the present invention to provide a short-circuit monitoring system with a maximum response time of less than the duration of one period of the mains frequency or detection signal frequency, and in particular with a response time of down to the duration of a half-period of these frequencies, that is to say down to, for example, 10 ms. The means whereby this object is achieved, according to the invention, utilize the same principle as in the subject of the above-mentioned main patent, but display applicability to detection signals of a general kind which, in their relative phase position, contain information regarding the distance of the short-circuit. Accordingly, the means whereby the object presented is achieved, according to the invention, are characterised, in respect of the process, by the features specified in claim 1 and, in respect of the circuit, by those specified in claim 7. These means of achieving the object are based on the phenomenon that only if the maximum value of the relative phase angles between successive detection signals is less than 180°, that is to say if the shortcircuit distance lies within the triggering range, does an at least twice alternating sequence of monitoring signals occur within a monitoring interval of at least approximately the duration of a half-period, or 10 ms, the signals being allotted, in a polarity-dependent manner, to the zero cross-overs of the detection signals.

Further characteristics and advantages of the invention will be explained with the aid of the illustrative embodiment shown in the drawings.

Figure 2:
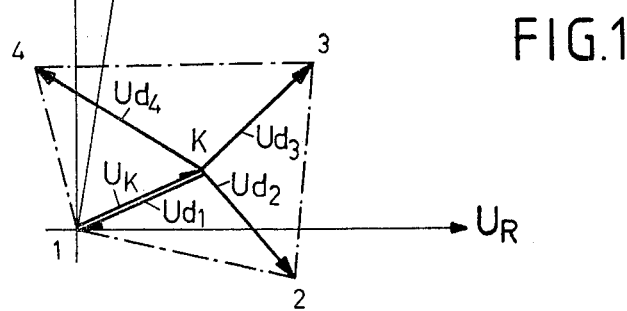
Figure 3:
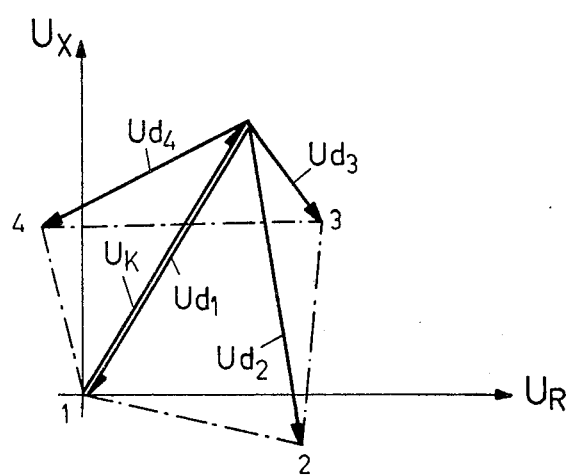
Figure 4:
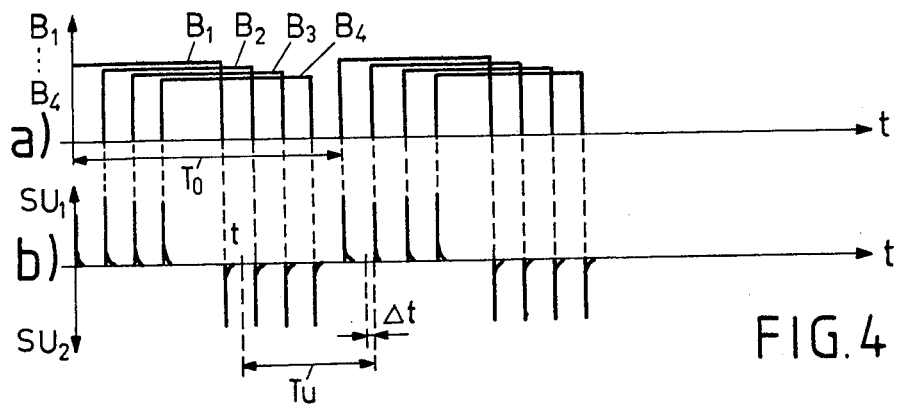
Figure 5:
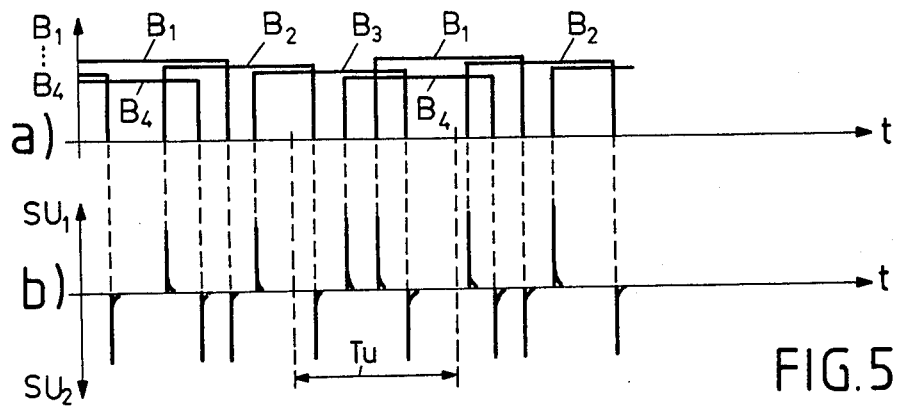
Figure 6:
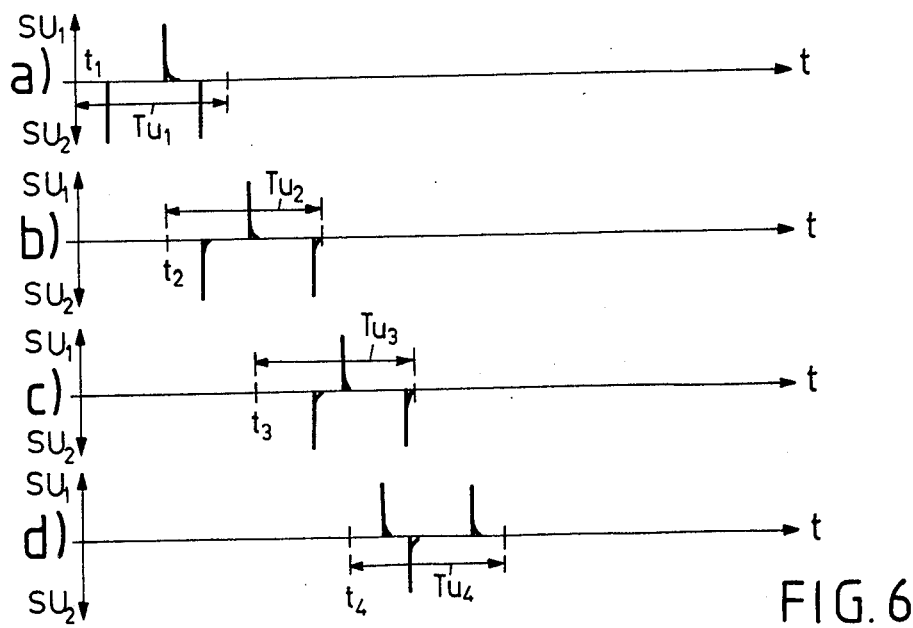
Figure 7:
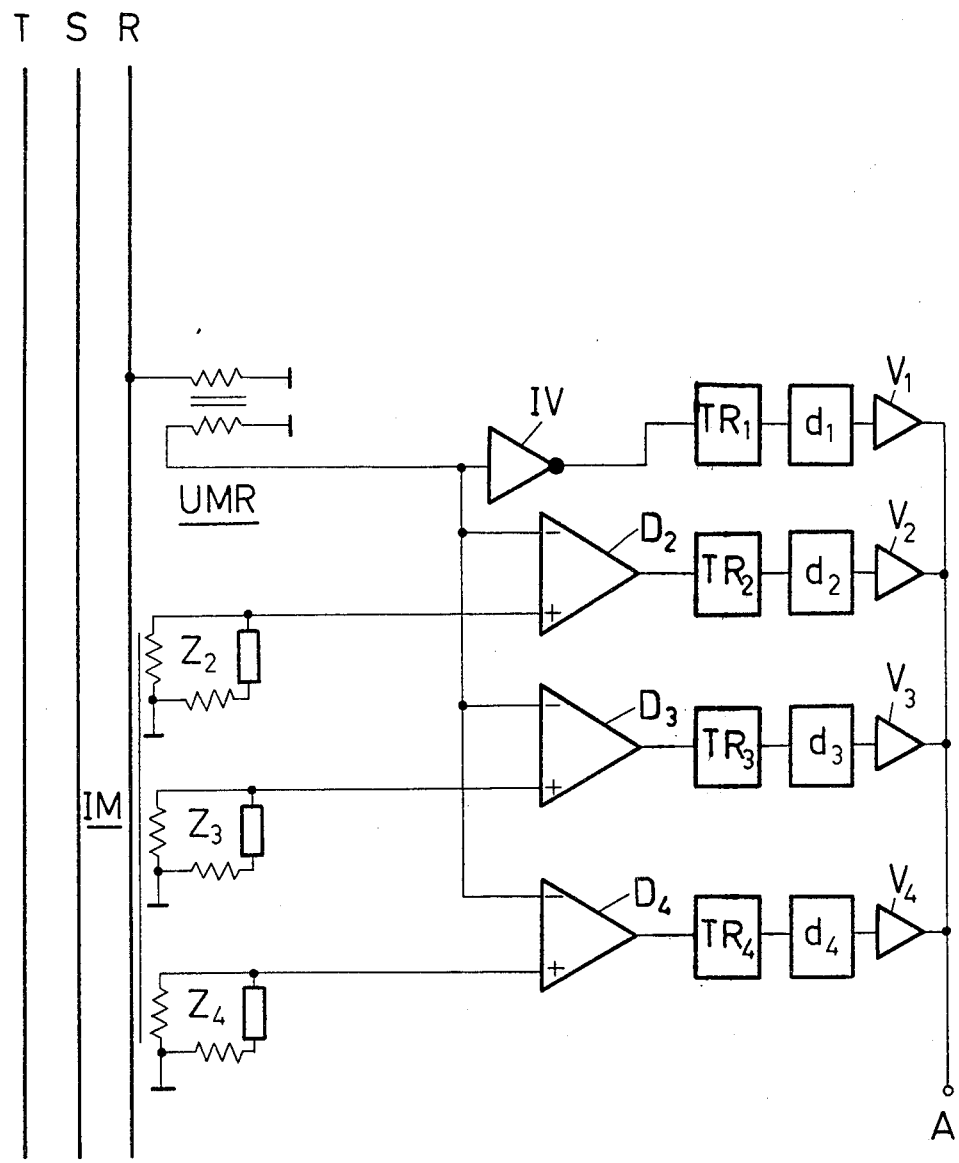
Figure 8:
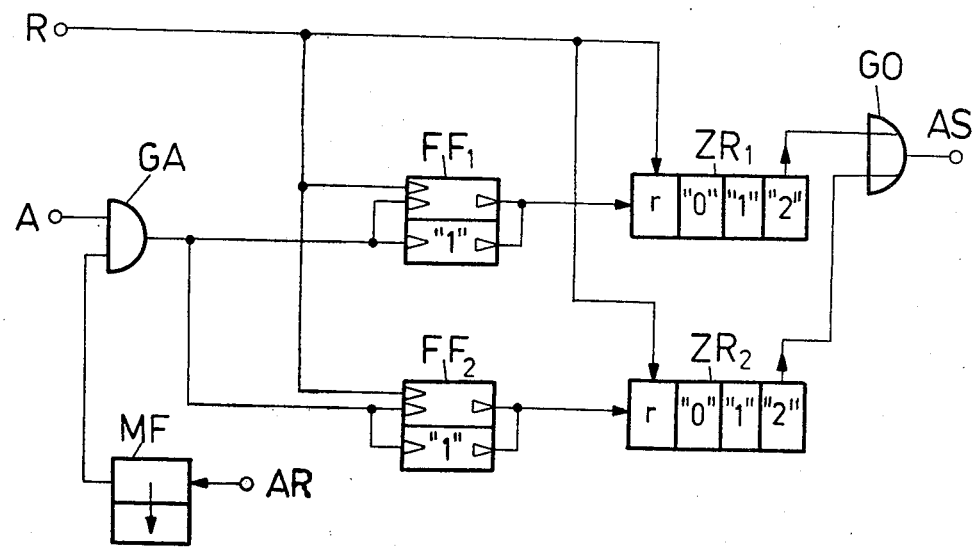
Figure 9:
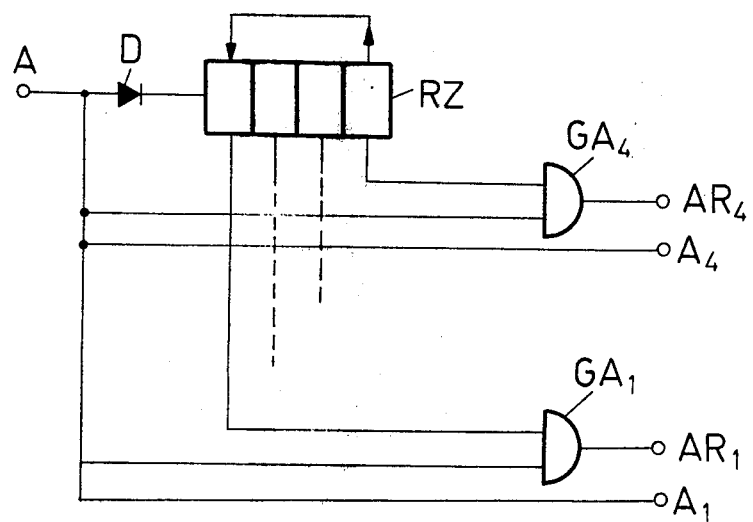

In the drawings:

FIG. 1 shows a vector diagram of impedance reference voltages in the imaginary $U_X$–$U_R$ voltage plane for a square distance protection triggering zone, FIG. 2 shows a vector diagram of difference signals formed from the reference impedance voltages according to FIG. 1 and a line voltage signal for a position of the latter within the triggering zone, FIG. 3 shows a vector diagram according to FIG. 2, but for a line voltage signal outside the triggering zone, FIG. 4 shows a signal/time diagram of a single sequence detection for a line voltage signal outside the triggering zone, FIG. 5 shows a signal/time diagram according to FIG. 4, but for a line voltage signal within the triggering zone, FIG. 6 shows a signal/time diagram for periodically successive sequence detections, FIG. 7 shows the measuring and signal-producing unit of a selective protection device, FIG. 8 shows the circuit diagram of a phase angle monitoring device with single sequence detection, for connection to the test unit according to FIG. 7 and FIG. 9 shows the circuit diagram of a phase angle monitoring device for multiple sequence detection.

The vector diagram according to FIG. 1 shows a square triggering zone with corners 1, 2, 3 and 4, with corner 1, for example, being at the origin of the coordinates, whilst the other corners are determined by reference impedance voltages $U_2$, $U_3$ and $U_4$ formed in a manner customary per se. As shown in FIG. 2, difference signals $Ud_2 = U_2 - U_K$, $Ud_3 = U_3 - U_K$ and $Ud_4 = U_4 - U_K$ are then formed with the aid of the line voltage signal $U_K$ obtained by measurement, and in addition a difference signal $Ud_1 = O - U_K$ is formed, this latter signal thus corresponding to the line voltage signal, but with reversed polarity, and repesenting an additional reference signal which is included in the monitoring of the relative phase angles between all vectors starting from the tip of the vector $U_K$ and hence determines the coordinate origin, as the corner point 1. The difference signals represent a special case of detection signals, which can, for example, be derived in various ways known per se from reference impedances or line reference impedances with the aid of the line current and the line voltage.

FIG. 2 shows, for a position of the vector tip of $U_K$ within the triggering zone, tht in this case none of the relative phase angles between detection signals which follow each other in time exceeds the critical value of 180°. The latter is only the case if the vector tip of $U_K$ lies outside the triggering zone, as is indicated in FIG. 3.

FIG. 4, line (a), shows square-topped pulses $B_1$ to $B_4$, derived from the positive and negative half-waves of the detection signals $Ud_1$–$Ud_4$, which pulses have been formed, for example, by conventional triggering. Line (b) shows, in connection therewith, the first and second monitoring signals $US_1$ and $US_2$, of opposite polarity, corresponding to the passes through zero and obtained, for example, by differentiation. For the position of the vector tip of $U_K$ outside the triggering zone (see FIG. 3), which is the basis here, there does not result, within any optionally located monitoring interval Tu of approximately the duration of a half-period, any monitoring signal sequence which alternates more than once.

FIG. 5, line (a) shows the overlap of the square-topped pulses $B_1$ to $B_4$ for a position of the vector tip of $U_K$ within the triggering zone determined by the four detection signals $Ud_1$ to $Ud_4$. Line (b) shows, correspondingly, the superposed total sequence of the first and second monitoring signals, of opposite polarity, obtained by differentiation of the square-topped pulses $B_1$ to $B_4$. For any location of the time of the monitoring interval Tu there result, within the said interval, different monitoring signal sequences which however always alternate in total at least twice. For the time position of Tu shown in FIG. 5, line (d), with starting time $t_0$, a monitoring signal sequence $SU_2$, $SU_1$, $SU_1$, $SU_2$ results, with the alternations taking place between the first and second, and between the third and fourth, monitoring signals occurring within Tu. Accordingly, all that matters is the total number of alternations occurring within the monitoring interval.

In the case of a monitoring interval having the duration of a half-period, and with a total of four detection signals, or with a square triggering zone, the fault distance criterion consists in the occurrence of at least two alternations, that is to say alternations between successive first and second, or second and first, monitoring signals. With such a triggering zone there may also occur three alternations within the half-period monitoring interval. The minimum number of alternations within the monitoring interval, which constitutes the fault criterion is in general determined by the number of detection signals or by the number of sides of the triggering zone in the complex-impedance plane. For more complicated arrangements with more than four-cornered triggering zones, higher minimum alternation figures may thus also occur as the fault criterion.

According to FIG. 5, line (b), a fault-indicating excitation for example triggers at time $t_0$ a single monitoring interval Tu. However, the procedure described can also be executed in the form of continuous distance monitoring, in which case the fault distance criterion remains unfulfilled in every case of fault-free operation and of short-circuits outside the triggering zone. This procedure has the advantage of greater reliability of operation of the protection device, because the essential components of the circuit are active even in fault-free operation and accordingly can easily be checked as to whether they are functioning.

An example of the last-mentioned procedure is indicated in FIG. 6, in particular with four successive monitoring intervals $Tu_1$ to $Tu_4$, started at times $t_1$ to $t_4$, as shown in lines (a) to (d) with the corresponding monitoring signals $SU_1$ and $SU_2$ which in each case form the alternations. The alternating monitoring signals are here taken from an illustrative universal monitoring signal sequence according to line (b) of FIG. 5.

At this point it is to be noted that the magnitude of the monitoring interval, corresponding to a half-period, is related to the repetition frequency of the detection signals and hence is general to the mains frequency of the object to be protected. Accordingly, at a mains frequency of fifty Hz, a monitoring interval duration $T_0/2 = 10$ ms is to be taken as the basis.

If the duration of the monitoring interval is less than a half-period, a boundary zone of signal arrangements in time results, which arrangements correspond to the location of a short-circuit within the triggering zone, and in particular in the vicinity of the boundary of this zone, but the decisive fault distance criterion remains unfulfilled. Accordingly, such conditions should in general be avoided. Conversely, monitoring interval durations of more than a half-period have the result that short-circuits which are near the boundary but are still outside the triggering zone fulfill the fault distance criterion and cause triggering. In general, therefore, a duration of the monitoring interval which is slightly greater than the half-period will be chosen. The preferred possible duration of this interval comprises the precise half-period $T_0/2$ plus a detection interval $\Delta t$ which depends on the detection mechanism and the inertia of the circuit. In principle, the monitoring interval can also be increased yet further and this—apart from the undesirable lengthening of the response time—leads to a broadening of the actually effective triggering zone. If the difference between the duration of the monitoring interval and the half-period is slight relative to the latter, the abovementioned adjustments in both directions may, depending on the circumstances of the particular application, be admissible or even desirable and therefore fall within the proviso "duration of monitoring interval at least approximately equal to a half-period," provided they are compatible with the object of reducing the protection system response time to less than the duration of one period.

The measuring and signal-generating part of a selective protection device, shown in FIG. 7, comprises a line voltage measured value receiver UMR which is here connected, by way of example, to the phase R of a three-phase line system R, S, T, and a line current measured value receiver IM, also connected to the phase R, with reference impedances $Z_2$, $Z_3$ and $Z_4$ connected to the secondary windings of this receiver. Accordingly, the reference voltages $U_2$ or $U_3$ or $U_4$, already mentioned, appear across these impedances, whilst the line voltage signal $U_K$ exists at the output of UMR. Difference amplifiers $D_2$, $D_3$, $D_4$ are connected on the one hand to the output of UMR and on the other hand to $Z_2$, $Z_3$ or $Z_4$ respectively, and thus provide, at their outputs, the difference signals or detection signals $Ud_2$, $Ud_3$ or $Ud_4$ respectively. In addition, UMR also provides, via an inverter IV, the signal $Ud_1 = -U_K$. The said detection signals are then converted, by subsequent triggers $TR_1$ to $TR_4$, into square-topped pulses $B_1$ to $B_4$. The monitoring signals $US_1$ and $US_2$ corresponding to the zero crossovers of the detection signals result at the outputs of the subsequent differentiating components $d_1$ to $d_4$, which are followed by buffer amplifiers $V_1$ to $V_4$ to achieve non-reactive superposition on the total monitoring signal sequence at output A.

The relative phase monitoring section for simple sequence detection according to FIG. 8 is connected, by its input A, to the corresponding output of the circuit portion shown in FIG. 7. Furthermore, the input AR is actuated. In addition, a reset input R, which is activated after triggering has taken place, is provided. As a result of the actuation AR, a monoflop MF is started, the step-back time of which determines the monitoring interval Tu and releases, for the duration of this interval, an AND-gate GA for passing the monitoring signals. These signals now switch—depending on the polarity of the monitoring signal which first occurs within the monitoring interval—one of two successive flip-flops $FF_1$ and $FF_2$ from the reset state to the set state (marked "1" for both flip-flops). The differentiating and interconnected outputs of the flip-flops provide, for each switch-over, a counting pulse to a corresponding tally register $ZR_1$ or $ZR_2$. As a result of the reset R, a first stage r of both tally registers $ZR_1$ and $ZR_2$ has been switched on after a triggering has been dealt with. The flip-flop which switches over first now switches on the next stage "0" of the corresponding tally register and accordingly brings this into the starting state for counting the alternations within the monitoring interval, whilst the other tally register stops when stage r is switched on and can no longer become active during the interval. Accordingly, one of the two tally registers is active for each polarity of the monitoring signal which first occurs during the monitoring interval.

During the first alternation, the stage "1," and during the second alternation the stage "2" of the particular tally register is switched on, and this, via a subsequent OR-gate GO causes activation of the triggering unit AS.

For continuous monitoring with successive monitoring intervals, each of which is, for example as shown in FIG. 6, line (a), triggered by one of the successive positive monitoring signals, a corresponding plurality of part-circuits according to FIG. 8 is required. In that case, a distributor circuit according to FIG. 9 must be connected to the output A of the part-circuit according to FIG. 7; this distributor circuit essentially consists of a ring counter which is stepped by the positive monitoring signals selected by means of a diode D. Each output of the successively activated stages of the ring counter prepares, in corresponding time sequence, a corresponding AND-gate $GA_1$ to $GA_4$ for switching-through the monitoring signals from input A. Accordingly, one monitoring signal at a time is switched through, in sequence, to one of the outputs $AR_1$ to $AR_4$ of the gates $GA_1$ to $GA_4$, where it exerts the function of an actuation for the corresponding subsequent part-circuit according to FIG. 8. Furthermore, for each of these part-circuits, one of the connections $A_1$ to $A_4$ for the feed of the monitoring signals themselves is provided.

It will be understood that where appropriate a different type of triggering of the successive monitoring intervals can also be used, for example triggering with uniform distribution of the triggering instants over a mains frequency period.

I claim:

1. A method for monitoring an electric line for short-circuits occurring within a predetermined distance from a measuring location at the line, in which line phase detection signals dependent on the distance between the measuring location and the short-circuit location are formed from the line current and the line voltage at the measuring location, and in which timewise immediately successive ones of said detection signals are subjected to a detection and comparison of their relative phase angles with a threshold value of at least approximately 180° to produce a triggering signal in the event of a short-circuit occurring within said predetermined distance, comprising the steps of:
   (a) forming at least three reference signals proportional to the voltage drop across a reference impedance each caused by a line current signal applied to the respective reference impedance, said at least three reference signals defining a polygonal trigger region;
   (b) forming from each of said reference signals a detection signal by forming the difference between a corresponding reference signal and a line voltage signal;
   (c) deriving first and second monitoring signals from the zero cross-overs of said detection signals, said first and second monitoring signals having positive and negative rates of change; and
   (d) sequence detecting said monitoring signals to produce said triggering signal, said triggering signal being derived from at least twice alternatingly successive first and second monitoring signals within a predetermined monitoring interval of at least approximately the duration of a half-period of the frequency of said detection signal.

2. The method of claim 1, wherein a monitoring interval of the duration of a half-period of the detection signal frequency plus a detection time duration is used for the sequence detection.

3. The method of claim 1, wherein said first and second monitoring signals are of opposite polarity, are preferably pulse-shaped, and are derived from the zero cross-overs of said detection signals with positive and negative signal change rates.

4. The method of claim 1, wherein said first and second monitoring signals are superposed for sequence detection to produce a monitoring signal sequence.

5. The method of claim 1, wherein said monitoring interval is started as a function of a fault-indexing actuation.

6. The method of any one of claims 1-5, wherein a plurality of sequence detections, each with a monitoring interval, is triggered at periodically successive start times.

7. Apparatus for monitoring an electric line for short-circuits occurring within a predetermined distance from a measuring location at the line, and including a measuring circuit for detecting line voltage signals and line current signals and a circuit for generating detection signals which determine a polygonal triggering zone in the complex-impedance plane, comprising:
   circuit means for generating first and second monitoring signals, utilizing said detection signals as an input, said first and second monitoring signals being correspondingly selective in respect to direction of the zero cross-overs of said detection signals;
   alternation detector means connected to said circuit means, for detecting the succession of said first and second monitoring signals; and
   alternation counter means connected to said alternating detector means for counting the alternations of said alternation detector.

8. The apparatus of claim 7, further including a plurality of alternation detectors and alternation counters preceded by a monitoring signal distribution circuit.

\* \* \* \* \*